(12) United States Patent
Guddekoppa et al.

(10) Patent No.: US 10,824,555 B2
(45) Date of Patent: Nov. 3, 2020

(54) METHOD AND SYSTEM FOR FLASH-AWARE HEAP MEMORY MANAGEMENT WHEREIN RESPONSIVE TO A PAGE FAULT, MAPPING A PHYSICAL PAGE (OF A LOGICAL SEGMENT) THAT WAS PREVIOUSLY RESERVED IN RESPONSE TO ANOTHER PAGE FAULT FOR ANOTHER PAGE IN THE FIRST LOGICAL SEGMENT

(71) Applicant: SAMSUNG ELECTRONICS CO., LTD., Suwon-si (KR)

(72) Inventors: Vishak Guddekoppa, Karnataka (IN); Arun George, Karnataka (IN); Mitesh Sanjay Mutha, Karnataka (IN); Rakesh Nadig, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 15/981,402

(22) Filed: May 16, 2018

(65) Prior Publication Data

US 2018/0336140 A1    Nov. 22, 2018

(30) Foreign Application Priority Data

May 17, 2017  (IN) .............................. 201741017338
Mar. 26, 2018  (IN) .............................. 201741017338

(51) Int. Cl.
*G06F 12/02*    (2006.01)

(52) U.S. Cl.
CPC .. *G06F 12/0246* (2013.01); *G06F 2212/1024* (2013.01); *G06F 2212/7201* (2013.01); *G06F 2212/7202* (2013.01); *G06F 2212/7203* (2013.01)

(58) Field of Classification Search
None
See application file for complete search history.

(56) References Cited

U.S. PATENT DOCUMENTS

| 4,972,316 A * | 11/1990 | Dixon ................. G06F 12/0866 711/113 |
| 8,051,268 B2 | 11/2011 | Nakanishi et al. |
| 8,185,686 B2 | 5/2012 | Chen et al. |
| 8,245,007 B2 | 8/2012 | Ohira et al. |
| 9,361,215 B2 | 6/2016 | Peters et al. |
| 9,563,555 B2 | 2/2017 | Flynn et al. |

(Continued)

*Primary Examiner* — William B Partridge
*Assistant Examiner* — Chie Yew
(74) *Attorney, Agent, or Firm* — Volentine, Whitt & Francos, PLLC

(57) ABSTRACT

A method for flash-aware heap memory management includes reserving a contiguous virtual space in a memory space of at least one process with a size equivalent to a size of a flash-based byte addressable device. The method also includes partitioning by a host device the memory space of the flash-based byte addressable device into multiple chunks. Each chunk includes multiple logical segments. The host device receives a memory allocation request from a thread associated with an application. The host device determines at least one chunk from the multiple chunks, including a least free logical segment compared to the other chunks from the multiple chunks. The host device allocates to the thread at least one chunk that includes the least free logical segment.

18 Claims, 19 Drawing Sheets

(56) References Cited

U.S. PATENT DOCUMENTS

| | | | |
|---|---|---|---|
| 2005/0050295 A1* | 3/2005 | Noel | G06F 12/08 |
| | | | 711/206 |
| 2008/0072119 A1* | 3/2008 | Rozman | G06F 11/1068 |
| | | | 714/763 |
| 2008/0104152 A1* | 5/2008 | Stephens | G06F 12/023 |
| 2009/0307432 A1* | 12/2009 | Fleming | G06F 12/023 |
| | | | 711/135 |
| 2010/0211756 A1* | 8/2010 | Kaminski | G06F 12/023 |
| | | | 711/172 |
| 2012/0011300 A1* | 1/2012 | Hung | G06F 12/0246 |
| | | | 711/103 |
| 2012/0239871 A1 | 9/2012 | Badam et al. | |
| 2012/0284479 A1* | 11/2012 | Foster | G06F 12/023 |
| | | | 711/170 |
| 2013/0111105 A1 | 5/2013 | Lain et al. | |
| 2014/0059274 A1* | 2/2014 | Kondo | G06F 12/0246 |
| | | | 711/103 |
| 2014/0189203 A1 | 7/2014 | Suzuki et al. | |
| 2016/0334997 A1* | 11/2016 | Wang | G06F 3/0605 |
| 2017/0068455 A1* | 3/2017 | Xing | G06F 3/0631 |
| 2017/0139827 A1* | 5/2017 | Crossland | G06F 12/0638 |

* cited by examiner

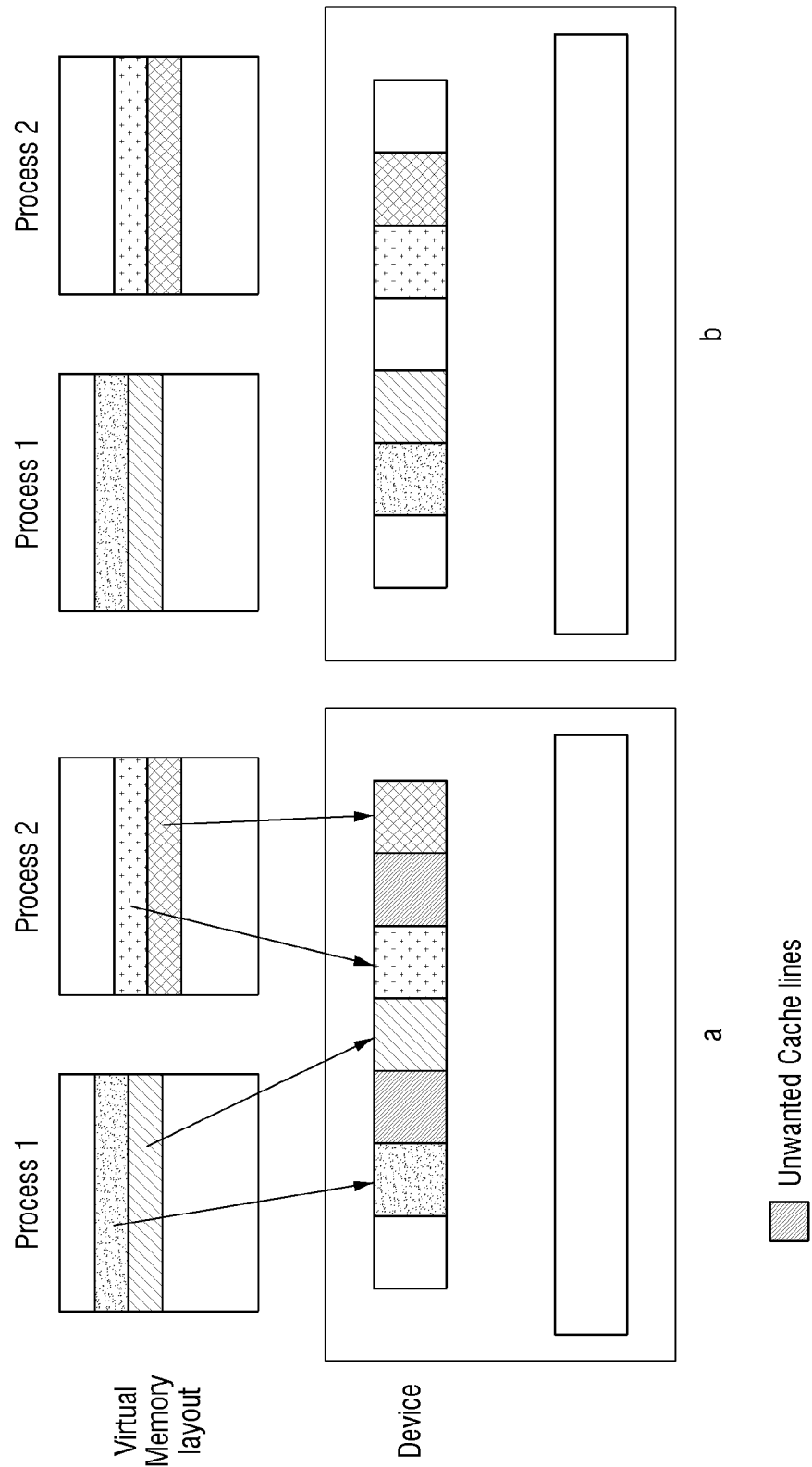

METHOD AND SYSTEM FOR FLASH-AWARE HEAP MEMORY MANAGEMENT WHEREIN RESPONSIVE TO A PAGE FAULT, MAPPING A PHYSICAL PAGE (OF A LOGICAL SEGMENT) THAT WAS PREVIOUSLY RESERVED IN RESPONSE TO ANOTHER PAGE FAULT FOR ANOTHER PAGE IN THE FIRST LOGICAL SEGMENT

CROSS-REFERENCE TO RELATED APPLICATION

This U.S. non-provisional patent application claims priority under 35 U.S.C. § 119 to Indian Patent Application Number 201741017338, filed on May 17, 2017 in the Indian Intellectual Property Office, the disclosure of which is hereby incorporated by reference in its entirety.

BACKGROUND

1. Technical Field

The present disclosure relates to memory management. More particularly, the present disclosure relates to a method and host device for flash-aware heap memory management.

2. Description of the Related Art

Many applications (e.g., big data analytics, financial real-time trading applications, online gaming applications or the like) depend on a large Random-Access Memory (RAM) size to cache a huge quantity of frequently accessed objects (e.g., indexes, lookup tables, key-value pairs, or the like) in a RAM to deliver high performance in a host device (e.g., laptop, desktop, computer, server or the like). This has resulted in increased requirements for Dynamic Random-Access Memory (DRAM). However, the cost for DRAM is very high. In order to address memory management in host devices, flash-based byte addressable memory devices have emerged.

In general, the flash-based byte addressable memory devices (e.g., Non-Volatile Dual In-Line Memory Module-P (NVDIMM-P)) include a DRAM cache and a NAND storage back bone. The DRAM cache and NAND storage back bone are connected to a Dual In-Line Memory Module (DIMM) interface. The access latency of the DRAM cache and NAND storage back bone can be higher than normal DRAM. Relative to DRAM, flash-based byte addressable memory devices have limited life span. Dynamic memory allocations (i.e., heap, as compared to stack for static memory allocations) from the flash-based byte addressable memory devices have different challenges compared to conventional heap allocations. The challenges are listed below:
  (a) Device Access Latency-Unlike DRAM, the flash-based byte addressable memory device access can have variable latencies. If data is in a device cache, the flash-based byte addressable memory device access is serviced immediately, but if the data is not present in the device cache, the flash-based byte addressable memory device access has to be read from the flash, resulting in variable latency.
  (b) Limited Life span-A higher cache flush rate results in higher NAND page writes, which in turn affects the life span of the host device. When an allocation size is lower than a device cache line size, a cache line may be underutilized, which causes write amplification and hence, lower life span. Also, when conventional allocators are used for flash-based byte addressable memory devices, a physical mapping for an allocation can span into some random physical pages. This results in accessing more NAND pages.
  (c) Metadata overhead—A metadata overhead of conventional allocators for the host device with large capacity is huge. A metadata layout, placement and access pose a challenge as it results in a cache thrashing.

The conventional allocators do not distinguish between different regions of a memory; all regions are expected to have uniform access latency. When the conventional allocators are used for the flash-based byte addressable memory device, the physical allocation for an application object can span into some random physical pages, thus resulting in more NAND page accesses. Further, random access results in increasing of device cache miss/device cache load scenarios which will increase the latency of the host device.

A demand paging in an operating system may result in consecutive physical pages being mapped to different virtual addresses in different processes. This will result in higher cache thrashing in a multithreaded environment, thereby increasing access latency.

Thus, it is desired to address the above-mentioned disadvantages or other shortcomings or at least provide a useful alternative.

A principal object of the embodiments herein is to provide a method and host device for flash-aware heap memory management.

Another object of the embodiments herein is to allocate a dynamic memory from a byte addressable flash-based memory device.

Another object of the embodiments herein is to effectively expand system memory using the flash-based byte addressable device without any major impact on throughput of the host device.

Another object of the embodiments herein is to optimize an access latency of the flash-based byte addressable memory device.

Another object of the embodiments herein is to reduce a metadata overhead for an allocator for large capacity devices.

SUMMARY

According to an embodiment, a method for flash-aware heap memory management includes reserving a contiguous virtual space in a memory space of at least one process with a size equivalent to a size of a flash-based byte addressable device. Further, the method includes partitioning, by a host device, the memory space of the flash-based byte addressable device into multiple chunks. Each chunk includes multiple logical segments. Further, the method includes receiving, by the host device, a memory allocation request from a thread associated with an application. Further, the method includes determining, by the host device, at least one chunk from the chunks including a least free logical segment compared to the other chunks from the chunks. Furthermore, the method includes allocating, by the host device, to the thread, at least one chunk comprising the least free logical segment.

According to an embodiment, a method for flash-aware heap memory management includes partitioning, by a host device, a flash-based byte addressable device into multiple chunks. Each chunk includes multiple logical segments. Further, the method includes storing, by the host device, multiple logical-to-physical (LTP) entries of the partitioned flash-based byte addressable device. Each of the LTP entries represents a logical address to a physical address mapping in the flash-based byte addressable device. Further, the method includes mapping, by the host device, each of a logical segment of a chunk from the chunks with a physical segment in the flash-based byte addressable device. Further, the method includes performing, by the host device, one of checking all page table entries (PTEs) in the physical segment when the logical segment is mapped with the physical segment, or reserving the physical segment when the logical segment is not mapped with the physical segment.

According to an embodiment, a host device for flash-aware heap memory management includes a processor, a host memory controller, and a host memory allocator. The host memory controller is configured to reserve a contiguous virtual space in a memory space of at least one process with a size equivalent to a size of a flash-based byte addressable device. Further, the host memory controller is configured to partition the memory space of the flash-based byte addressable device into multiple chunks, where each chunk includes multiple logical segments. Further, the host memory controller is configured to receive a memory allocation request from a thread associated with an application. The host memory allocator is configured to determine at least one chunk from the chunks including a least free logical segment compared to the other chunks from the chunks. Further, the host memory allocator is configured to allocate the thread to the at least one chunk including the least free logical segment.

According to an embodiment, a host device for flash-aware heap memory management includes a processor, a host memory controller, a logical-to-physical (LTP) address controller and a device driver. The host memory controller is configured to partition the flash-based byte addressable device into multiple chunks, where each chunk includes multiple logical segments. The LTP address controller is configured to store multiple LTP entries of the partitioned flash-based byte addressable device. Each of the LTP entries represents a logical address to a physical address mapping in the flash-based byte addressable device. A device driver is configured to map each of a logical segment of a chunk from the chunks with a physical segment in the flash-based byte addressable device. The device driver is configured to perform one of checking all PTEs in the physical segment when the logical segment is mapped with the physical segment, or reserving the physical segment when the logical segment is not mapped with the physical segment.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Flash-aware heap memory management is illustrated in the accompanying drawings, throughout which like reference letters indicate corresponding parts in the various figures. The embodiments herein will be better understood from the following description with reference to the drawings, in which:

FIG. 16 is an example illustration in which a reduction of a device cache footprint is explained, according to an embodiment as disclosed herein;

DETAILED DESCRIPTION

Figure 1:
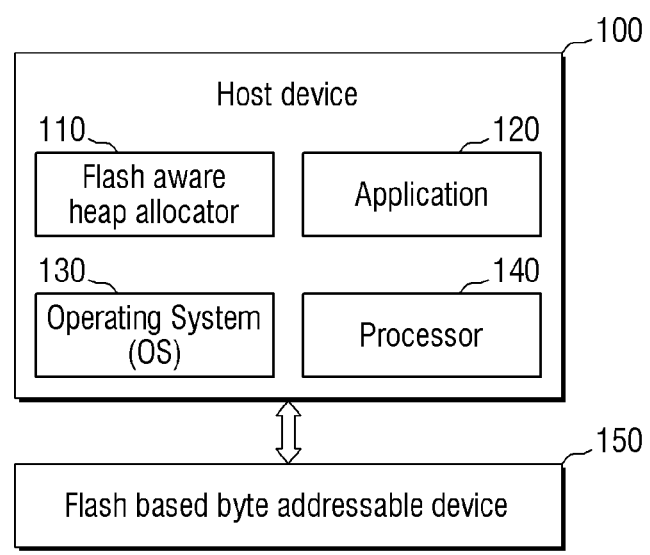
FIG. 1 is a block diagram illustrating a host device for flash-aware heap memory management, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention(s) described herein. Likewise, the blocks of the embodiments may be physically combined into more complex blocks without departing from the scope of the invention(s) described herein.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Embodiments herein disclose a method for flash-aware heap memory management. The method includes reserving a contiguous virtual space in a memory space of one or more processes with a size equivalent to a size of a flash-based byte addressable device. Further, the method includes partitioning, by a host device the memory space of the flash-based byte addressable device into multiple chunks. Each chunk includes multiple logical segments. Further, the method includes receiving, by the host device, a memory allocation request from a thread associated with an application. Further, the method includes determining, by the host device, at least one chunk from the chunks including a least free logical segment compared to the other chunks from the chunks. Furthermore, the method includes allocating, by the host device, to the thread at least one chunk including the least free logical segment. As a result, the current allocation request can be serviced by allocating to the requesting thread the at least one chunk with the least free logical segment.

Unlike conventional methods and systems, the methods described herein can be used to allocate dynamic memory from the byte addressable flash-based memory device. The methods described herein can be used to minimize a metadata overhead and access latency. The methods described herein can be used to minimize an access latency through maximizing device cache hits for an application.

Unlike conventional methods and systems, the methods described herein can be used to reserve the virtual space of the size equal to a device capacity in a process address space.

The virtual space is segregated as a metadata area and a user area. The user area is divided into a number of chunks, each chunk is divided into segments (i.e., bunch of NAND pages). Each user thread is always associated with a set of chunks. The methods described herein can be used to allocate the memory from the current chunk associated with the thread, so as to ensure that a best fit is found for the allocation while choosing the least free segment in that chunk. This results in minimizing the metadata overhead and the access latency.

The methods described herein can be used to ensure contiguity in the virtual space and the physical space at a granularity of the segment for the application. The physical contiguity is ensured through pre-allocation and page table manipulation at an operating system level. This assists a host memory allocator to associate a minimum number of the flash-based byte addressable device pages to an application object. The pre-allocation of the physical memory pages is introduced to avoid fragmented physical space. A 1:1 mapping of virtual segment and physical segment is used to minimize the metadata overhead and the access latency.

By reserving the virtual space equal to the device capacity and having contiguous virtual space, fixed chunk and segment sizes, the methods described herein can keep indexes (not exact virtual addresses) for metadata management. Working with indexes and static metadata helps reduce the metadata overhead issues. Also, a separate metadata area helps in reducing cache thrashing. In some case, some metadata areas are pinned to the device cache, thereby avoiding repeated loads for frequently referred metadata.

The methods described herein can be used to expand the system memory without any major impact on throughput compared to pure DRAM based solutions. The methods described herein can be used to reduce the number of physical servers and maintenance in a cost-effective manner.

In the methods described herein, a contiguous virtual area, a size of one flash-based byte addressable device, will be pre-allocated in the virtual memory space of a process with the help of a driver, the allocations on the host device will be served only from the pre-allocated area. This will provide the allocations to be contiguous in the virtual space. This will help reduce the metadata overhead of a host memory allocator since the host memory allocator can use an index based procedure for accessing allocated area. This results in less virtual area to operate for the host memory allocator, which in turn results in lesser meta and lesser cache pollution The methods described herein can be used to reduce the number of NAND pages to be accessed for metadata per thread. The method can be used to reduce the garbage area in an allocated flash-based byte addressable device page.

Referring now to the drawings and more particularly to FIGS. 1 through 18 these are shown preferred embodiments.

FIG. 1 is a block diagram illustrating a host device 100 for flash-aware heap memory management, according to an embodiment as disclosed herein. The host device 100 can be, for example, but is not limited to a laptop computer, a tablet computer, a personal digital assistant (PDA), a smart phone, a server or the like. In an embodiment, the host device 100 includes a flash aware heap allocator 110, an application 120, an OS 130 (Operating System), a processor 140. The host device 100 communicates with a flash-based byte addressable device 150.

In an embodiment, the flash aware heap allocator 110 is configured to reserve a contiguous virtual space in a memory space with a size equivalent to a size of the flash-based byte addressable device 150. After reserving the contiguous virtual space in the memory space with the size equivalent to the size of the flash-based byte addressable device 150, the flash aware heap allocator 110 is configured to partition the memory space of the flash-based byte addressable device 150 into multiple chunks. Each chunk includes multiple logical segments. Further, the flash aware heap allocator 110 is configured to receive a memory allocation request from a thread associated with the application 120 (e.g., social networking application, financial real-time trading application, online gaming application, a big data analytics application or the like). Further, the flash aware heap allocator 110 is configured to determine at least one chunk from the chunks including a least free logical segment compared to the other chunks from the chunks. Further, the flash aware heap allocator 110 is configured to allocate the thread to the at least one chunk including the least free logical segment. As a result, the current memory allocation request can be serviced by allocating to the requesting thread the at least one chunk with the least free logical segment.

In an embodiment, each segment of the at least one chunk is allocated contiguously in the memory space and is equal to a size of at least one device page.

In an embodiment, all the threads associated with the application 120 are allocated to at least one chunk from the chunks.

In an embodiment, a least free chunk from the chunks is first allocated compared to the other chunks from the chunks. The least free chunk may be the chunk with the least free logical segment, but may alternatively be a different chunk which is comprehensively the least free.

In an embodiment, the logical segments correspond to flash-based byte addressable device pages, where each of the logical segments represents a contiguous physical range stored at the flash-based byte addressable device 150.

In an embodiment, the flash aware heap allocator 110 is configured to store multiple LTP entries. Each of the LTP entries represents a mapping of a logical address to a physical address in the flash-based byte addressable device 150. Further, the flash aware heap allocator 110 is configured to map each of a logical segment of each of the chunks with a physical segment in the flash-based byte addressable device 150. In an embodiment, the flash aware heap allocator 110 is configured to check all PTEs in the physical segment when the logical segment is mapped with the physical segment.

In an example, a page fault is triggered for a page P1 which belongs to the segment S1, so all the PTEs corresponding to every page in the segment S1 are checked to see if they are valid. If at least one entry is valid, it means the existence of the mapping. The valid PTE is extracted to find the physical segment number and the corresponding physical page number also can be found in that segment. The method does not require any data structures to maintain, so the metadata overhead is not there.

In another embodiment, the flash aware heap allocator 110 is configured to reserve the physical segment when the logical segment is not mapped with the physical segment.

In an embodiment, the memory space is configured to store metadata in a metadata partition in the flash-based byte addressable device 150, where the metadata partition is separated from the user allocated portion in the flash-based byte addressable device 150.

In an embodiment, the contiguous virtual space is managed by index based data structures.

In an embodiment, each of the logical segments includes at least one allocated page, where the allocated logical segment borrows at least one physical page from other logical segments, if the at least one physical page is yet to be allocated.

In an embodiment, information of at least one unused logical segment from the logical segments is shared with the flash-based byte addressable device 150 to remove mapping of the at least one unused logical segment.

In an embodiment, the flash aware heap allocator 110 is configured to partition the part of the virtual space of the application 120 which is the size of the flash-based byte addressable device 150 into the chunks. Further, the flash aware heap allocator 110 is configured to store the LTP entries of the partitioned flash-based byte addressable device, where each of the LTP entries represents the logical address to the physical address mapping in the flash-based byte addressable device 150. Further, the flash aware heap allocator 110 is configured to map each of the logical segments of the chunks from the chunks with the physical segment in the flash-based byte addressable device 150. In an embodiment, the flash aware heap allocator 110 is configured to check all PTEs in the physical segment when the logical segment is mapped with the physical segment. In another embodiment, the flash aware heap allocator 110 is configured to reserve the physical segment when the logical segment is not mapped with the physical segment.

The OS 130 allocates physical pages in terms of 4 KB (RAM pages) during the page fault. The processor 140 communicates with the flash aware heap allocator 110, the application 120, the OS 130, and the flash-based byte addressable device 150.

Although the FIG. 1 shows the hardware components of the host device 100 but it is to be understood that other embodiments are not limited thereto. In other embodiments, the host device 100 may include fewer or more hardware components. Further, the labels or names of the hardware components are used only for illustrative purpose and do not limit the scope of the invention(s) described herein. One or more components can be combined together to perform same or substantially similar function to perform the flash-aware heap memory management in the host device 100.

Figure 2:
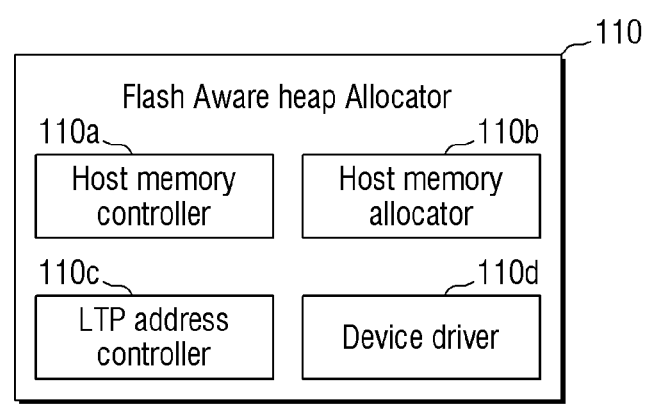
FIG. 2 is a block diagram illustrating a flash aware heap allocator, according to an embodiment as disclosed herein.

FIG. 2 is a block diagram illustrating the flash aware heap allocator 110, according to an embodiment as disclosed herein. In an embodiment, the flash aware heap allocator 110 includes a host memory controller 110a, a host memory allocator 110b, a LTP address controller 110c, and a device driver 110d. The host memory controller 110a is configured to reserve the contiguous virtual space in the memory space with the size equivalent to the size of the flash-based byte addressable device 150. Further, the host memory controller 110a is configured to partition the memory space of the flash-based byte addressable device 150 into the chunks. Further, the host memory controller 110a is configured to receive the memory allocation request from the thread associated with the application 120.

After receiving the memory allocation request as a current allocation request from the thread associated with the application 120, the host memory allocator 110b is configured to determine the at least one chunk from the chunks including the least free logical segment compared to the other chunks from the chunks. After determining the at least one chunk from the chunks including the least free logical segment compared to the other chunks from the chunks, the host memory allocator 110b is configured to allocate to the thread at least one chunk including the least free logical segment.

In an embodiment, the memory allocation is carried out in a best-fit manner i.e. the host memory allocator 110b is configured to choose the segment which can provide the best fit in an initial stage. In case both the segments can service the memory allocation request, the host memory allocator 110b is configured to select depending on the least free segment. This will ensure that minimum number of the flash device pages is used.

In an embodiment, if the cache line size>4K (RAM page size), there is a chance of under-utilization of the cache line, so that the next 'small' allocation will be provided from the previous non-full cache line.

In an embodiment, when the segment is found to be unused, it is unpinned (eligible to be evicted) from the device cache.

Further, the LTP address controller 110c is configured to store the LTP entries, where each of the LTP entries represents the mapping of the logical address to the physical address in the flash-based byte addressable device 150. The device driver 110d is configured to map each of the logical segments of each of the chunks with the physical segment in the flash-based byte addressable device 150. In an embodiment, the device driver 110d is configured to check all PTEs in the physical segment when the logical segment is mapped with the physical segment. In another embodiment, the device driver 110d is configured to reserve the physical segment when the logical segment is not mapped with the physical segment.

In an embodiment, if at least one of the PTEs is populated, the device driver 110d indicates that the segment is already reserved. The segment number is extracted from the existing PTE, and the corresponding page is allocated for the current fault.

In an embodiment, if none of the PTEs in the same virtual segment is populated, it means that no physical segment is allocated for the virtual segment, then the device driver 110d proceeds to allocate a new physical segment and fills the corresponding PTE with the newly allocated one.

Although FIG. 2 shows the hardware components of the flash aware heap allocator 110, it is to be understood that other embodiments are not limited thereto. In other embodiments, the flash aware heap allocator 110 may include fewer or more of hardware components. Further, the labels or names of the hardware components are used only for illustrative purpose and do not limit the scope of the invention(s) described herein. One or more components can be combined together to perform same or substantially similar function to perform the flash-aware heap memory management in the host device 100.

Figure 3:
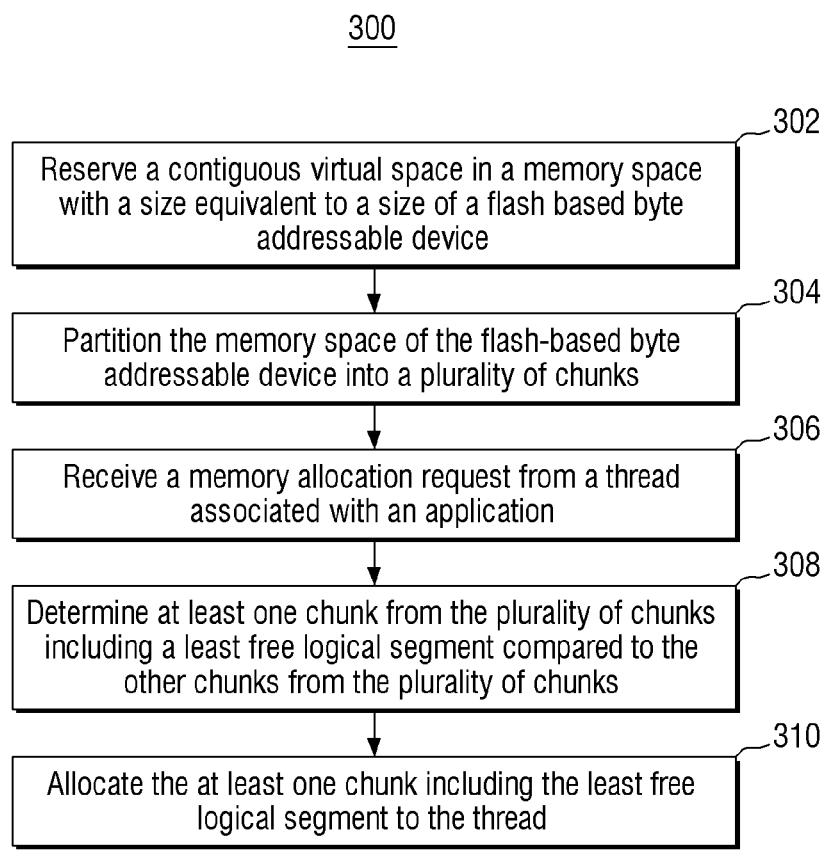
FIG. 3 is a flow diagram illustrating various operations for flash-aware heap memory management, according to an embodiment as disclosed herein.

FIG. 3 is a flow diagram 300 illustrating various operations for flash-aware heap memory management, according to an embodiment as disclosed herein. At 302, the method includes reserving the contiguous virtual space in the memory space for one or more processes with the size equivalent to the size of the flash-based byte addressable device 150. In an embodiment, the method allows the host memory controller 110a to reserve the contiguous virtual space in the memory space with the size equivalent to the size of the flash-based byte addressable device 150. At 304, the method includes partitioning the memory space of the flash-based byte addressable device 150 into the chunks. In an embodiment, the method allows the host memory controller 110a to partition the memory space of the flash-based byte addressable device 150 into the chunks.

At 306, the method includes receiving the memory allocation request from the thread associated with the application 120. In an embodiment, the method allows the host memory controller 110a to receive the memory allocation request from the thread associated with the application 120. At 308, the method includes determining at least one chunk from the chunks including the least free logical segment compared to the other chunks from the chunks. In an embodiment, the method allows the host memory allocator 110b to determine the at least one chunk from the chunks including the least free logical segment compared to the other chunks from the chunks.

At 310, the method includes allocating the at least one chunk including the least free logical segment to the thread. In an embodiment, the method allows the host memory allocator 110b to allocate the thread to the at least one chunk including the least free logical segment.

The various actions, acts, blocks, steps, or the like in the flow diagram 300 may be performed in the order presented, in a different order or simultaneously. Further, in some embodiments, some of the actions, acts, blocks, steps, or the like may be omitted, added, modified, skipped, or the like without departing from the scope of the invention(s) described herein.

Figure 4:
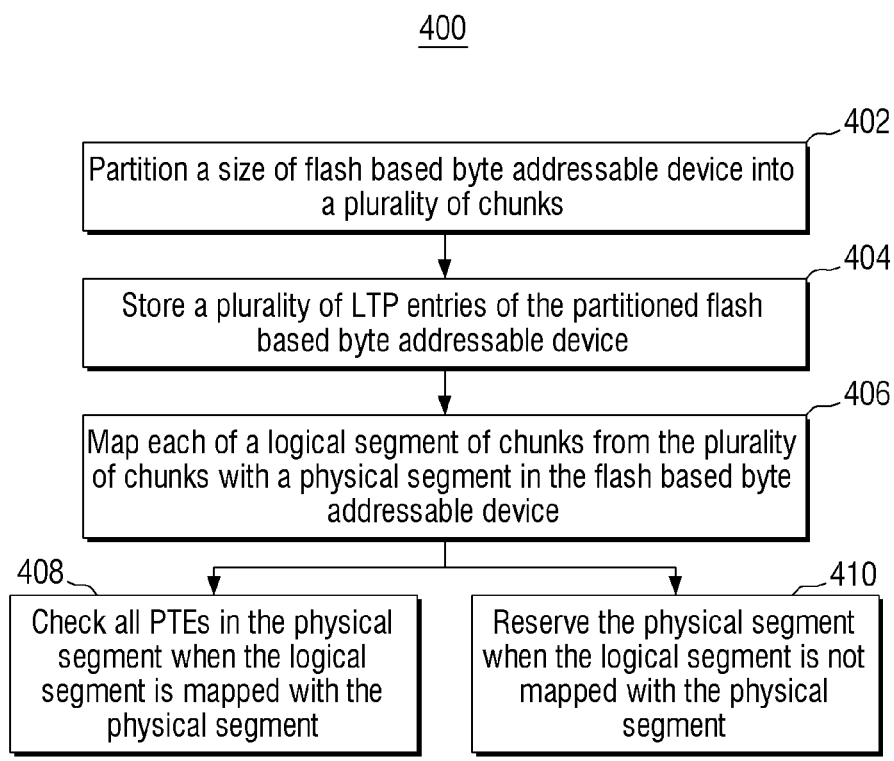
FIG. 4 is another flow diagram illustrating various operations for flash-aware heap memory management, according to an embodiment as disclosed herein.

FIG. 4 is a flow diagram 400 illustrating various operations for flash-aware heap memory management, according to an embodiment as disclosed herein. At 402, the method includes partitioning the size of flash-based byte addressable device 150 into the chunks. In an embodiment, the method allows the host memory controller 110a to partition the flash-based byte addressable device 150 into the chunks. At 404, the method includes storing the plurality of LTP entries of the partitioned flash-based byte addressable device. In an embodiment, the method allows the LTP address controller 110c to store the LTP entries of the partitioned flash-based byte addressable device.

At 406, the method includes mapping each of the logical segments of the chunks from the chunks with the physical segment in the flash-based byte addressable device 150. In an embodiment, the method allows the device driver 110d to map each of the logical segments of the chunks from the chunks with the physical segment in the flash-based byte addressable device 150.

At 408, the method includes checking all PTEs in the physical segment when the logical segment is mapped with the physical segment. In an embodiment, the method allows the device driver 110d to check all PTEs in the physical segment when the logical segment is mapped with the physical segment.

At 410, the method includes reserving the physical segment when the logical segment is not mapped with the physical segment. In an embodiment, the method allows the device driver 110d to reserve the physical segment when the logical segment is not mapped with the physical segment.

The method can be used to maintain the allocations for the thread as close to each other as possible. Keeping allocations close to each other will reduce the loads required from the flash to the cache. Also, this spatial locality helps in reducing the cache usage as opposed to when the allocations are spread far apart.

The method can be used to allocate the memory from the current chunk associated with the thread. It tries to ensure that the best fit is found for the allocation while choosing the least free segment in that chunk. If the best fit is not found in the current chunk, the method can be used to try to find a different chunk (another least free) among other chunks associated with the thread, which can provide the best fit. This policy is adopted to reduce the write amplification inside device as well as keep the fragmentation low.

The metadata is handled at the chunk level. Another benefit of the spatial locality is that the chunks used for the application are minimized so as to reduce the metadata usage. Also, by dividing the area into chunks, the metadata can be handled in a modular way. Each user thread is associated to few chunks, so as to eliminate a lock contention and interdependency for metadata access.

In the methods described herein, a separate metadata area helps in reducing cache thrashing. Some metadata areas are pinned to the device cache, thereby, avoiding repeated loads for frequently referred metadata.

Physical contiguity is ensured through pre-allocation and page table manipulation at the operating system level. This helps allocator to associate minimum number of flash device pages to application objects.

Pre-allocation of physical memory pages is introduced to avoid fragmented physical space. The 1:1 mapping of virtual segment and physical segment is kept. Operating system page table entries are traversed within the segment to establish the mapped physical segment. If physical segment is mapped, mapping is established by getting offset within the segment. If there is no mapping, this method reserves a physical segment on device and does the page mapping in operating system; all other pages in the segment are reserved for the same virtual segment.

The method can be used to allocate the memory from associated chunks prior to allocating a new chunk, so as to result in minimization of the virtual space usage by the thread (and process) from the host device 100.

The various actions, acts, blocks, steps, or the like in the flow diagram 400 may be performed in the order presented, in a different order or simultaneously. Further, in some embodiments, some of the actions, acts, blocks, steps, or the like may be omitted, added, modified, skipped, or the like without departing from the scope of the invention(s) described herein.

Figure 5:
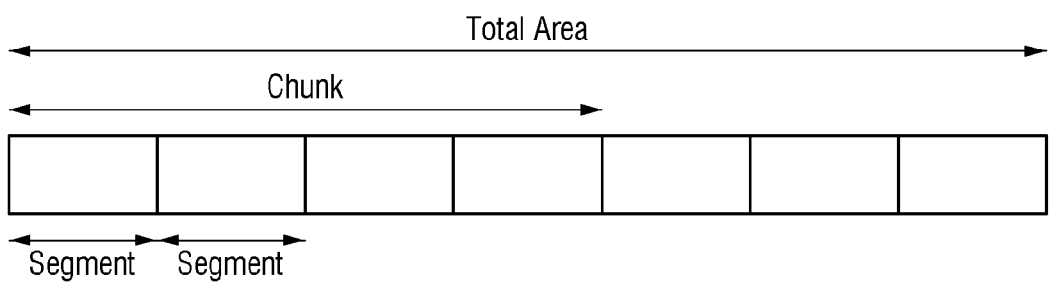
FIG. 5 illustrates a chunk and a segment in a virtual space, according to an embodiment as disclosed herein.
Figure 6:
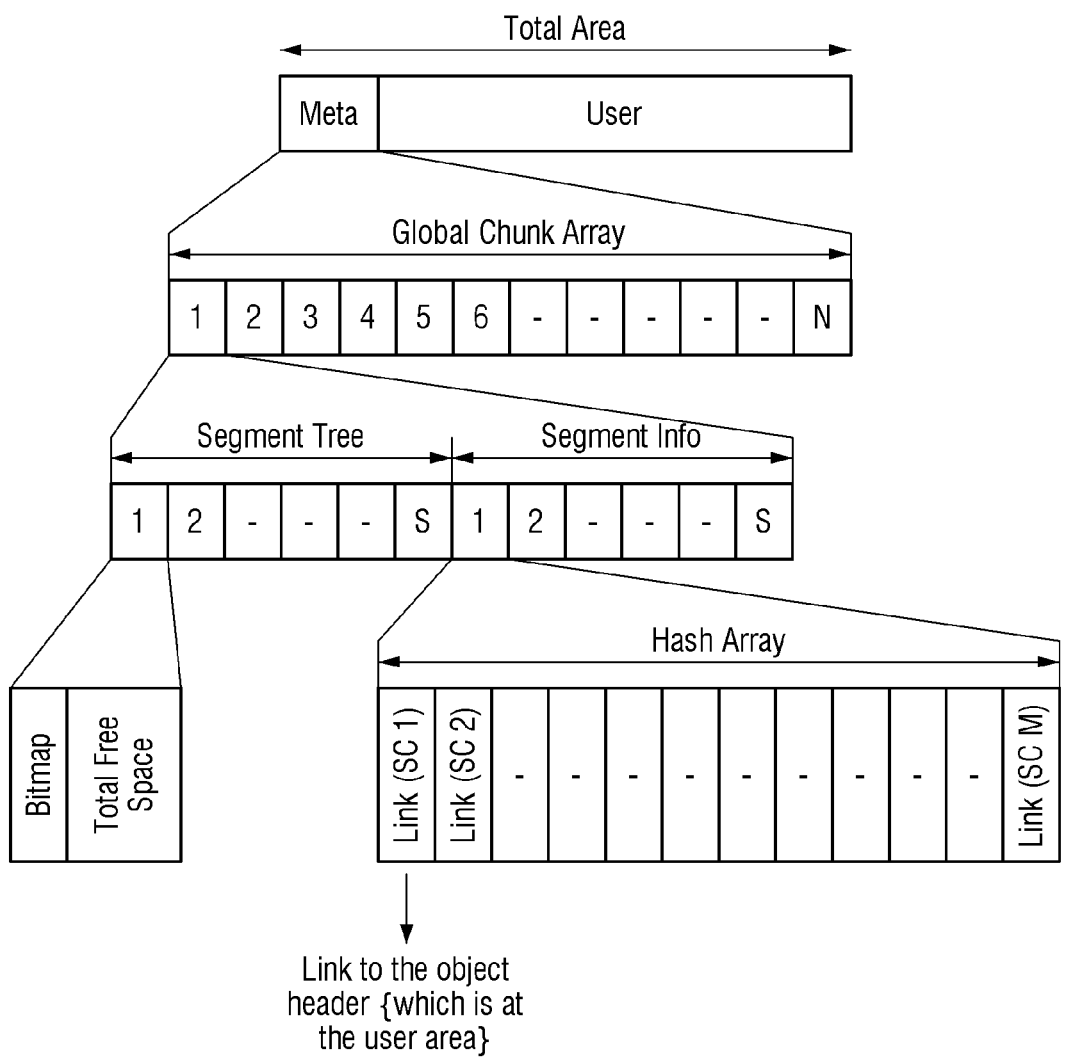
FIG. 6 illustrates an overview of a metadata organization, according to an embodiment as disclosed herein.
Figure 7:
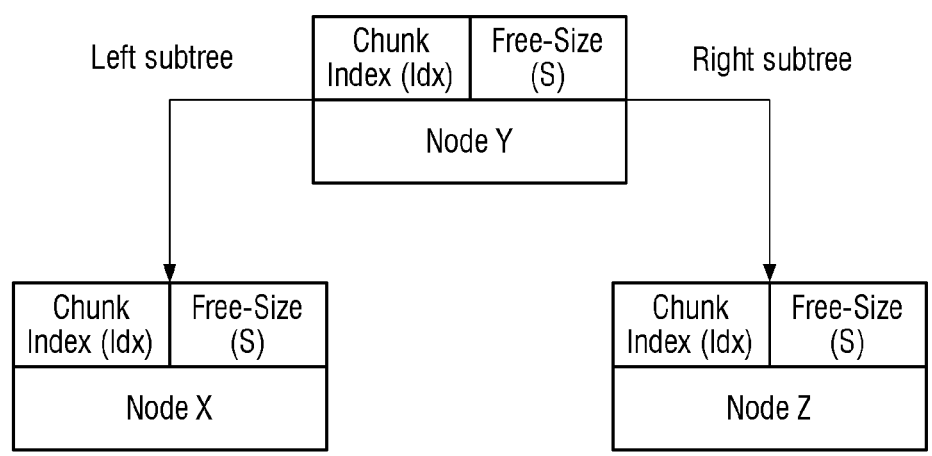
FIG. 7 illustrates a representation of a free-size ordered tree, according to an embodiment as disclosed herein.

FIG. 5 illustrates a chunk and a segment in a virtual space, according to an embodiment as disclosed herein. FIG. 6 illustrates an overview of a metadata organization, according to an embodiment as disclosed herein.

The methods described herein can be used to reserve the virtual space of the size equal to device capacity in the process address space. The virtual space is segregated as the metadata area and the user area as shown in the FIG. 6. The user area is divided into the number of chunks, where each chunk is divided into the set of segments (i.e., bunch of NAND pages). Each user thread is always associated with the set of chunks.

The chunk is, basically, multiple segments and the segment is equal to the size as one or multiple flash device pages. The segment is the entity that represents some contiguous logical flash device pages. A scheme that enables a library to make a decision of trying to minimize number of flash device pages would now be analogous to minimize the number of segments.

In an embodiment, a thread specific information will contain the information regarding the chunks it holds. The thread specific information also holds a free-size ordered tree of the chunks. This tree will help to make quick decision while needing to change a current chunk pointer.

The thread specific information will be stored not on the flash-based byte addressable device 150 but on the DRAM. The reason behind this is that the flash aware heap allocator 110 wants to keep a static allocation for any metadata on the flash-based byte addressable device 150. The thread specific information cannot be statically allocated as this may lead to capping the number of threads to a certain number.

This chunk is found using the free-size ordered tree. The fundamental idea, here, is that free-size of Node Y, Sy>=Sx and Sz>Sy. This is how the tree will be ordered as shown in the FIG. 7.

Global Chunk Information Array:

The information of all the chunks is kept in an array format. Every array index indicates the chunk i.e. array element number "1" represents information regarding chunk "1".

Chunk Information:

The methods described herein can be used to provide the dynamic allocation and de-allocation of the heap memory at the thread level. This means that the thread will be able to have its own specific chunks for its allocation and de-allocation. This enables different threads to operate on their own without having to worry about contention/locking, thereby reducing latencies. The chunk information will contain the information about the mapping of the chunk to the thread. This mapping is required to figure out which thread the chunk belongs to in case of free.

Apart from that, the methods described herein maintain two arrays segment tree and segment-info array.

A. Segment Info Array: array [0 . . . S−1]

B. Segment Tree: array [0 . . . S−2]

The segment Tree acts as a balanced binary tree of S−1 nodes with implicit links. The segment tree will have the details like total free space in the segment and serviceable chunks in the sub-tree. The segment info array and the segment tree are required for every chunk.

By virtue of having contiguous virtual space, fixed chunk and segment sizes, the method can be used to keep indexes (not exact virtual addresses) for the metadata as shown in the FIG. 6. This approach is similar to the metadata maintenance by a filesystem. Working with indexes and static metadata helps reduce the overheads to a minimum.

Figure 8:
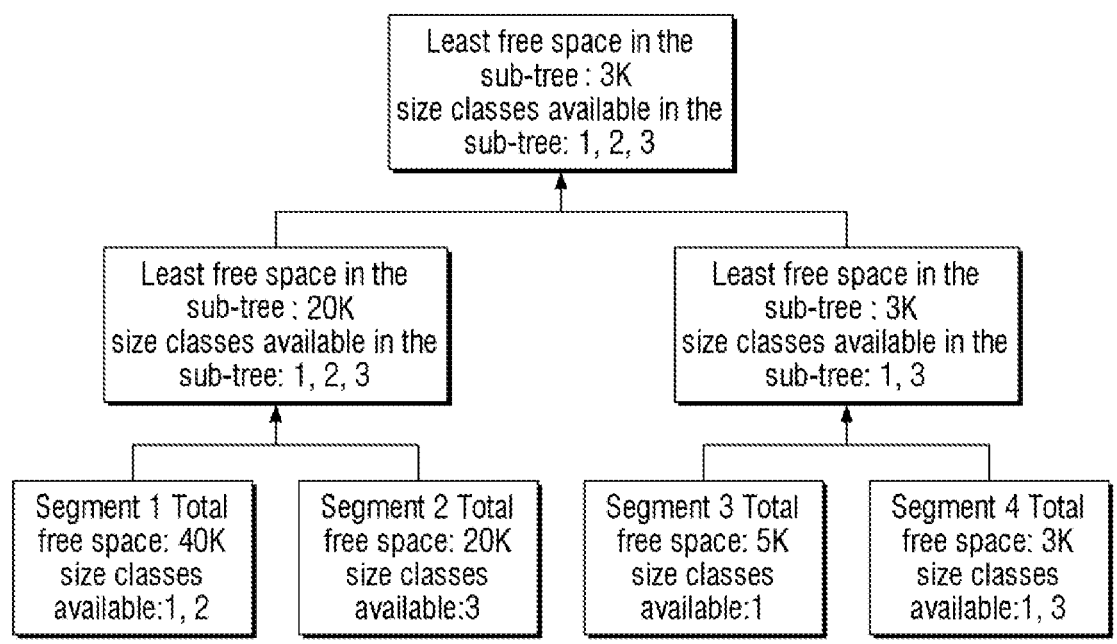
FIG. 8 illustrates a segment tree and a segment information relation, according to an embodiment as disclosed herein.
Figure 9:
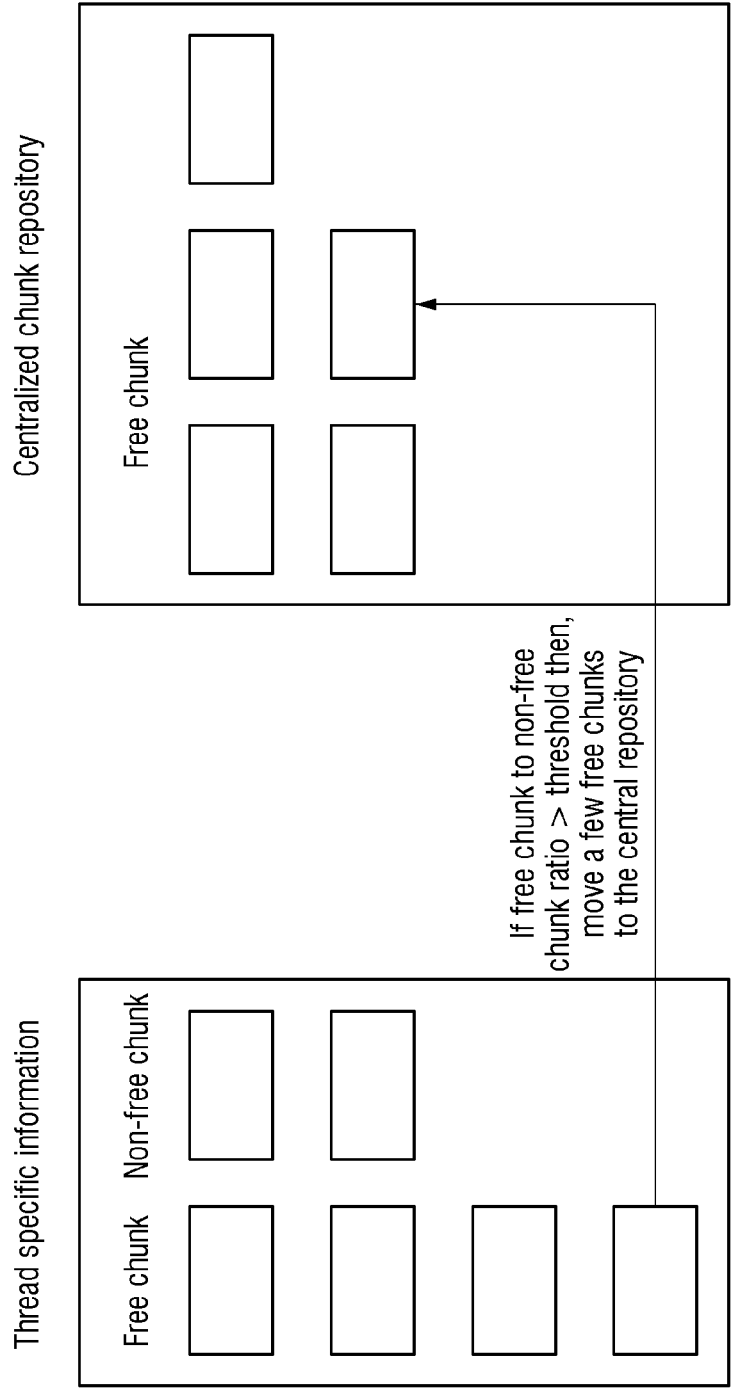
FIG. 9 illustrates a thread access central repository for free chunks, according to an embodiment as disclosed herein.

FIG. 8 illustrates a segment tree and a segment information relation, according to an embodiment as disclosed herein.

The segment tree is created using the information from the segment info structures. The segment tree element provides data about two things, i.e., the least free space in the sub-tree (it could be two or more blocks), and the size classes available in the sub-tree. The information helps to quickly find if there is a serviceable block in any segment and select appropriately.

Segment Information and Free Block Data Structures:

Every segment will have a hash array which holds the free blocks. The number of elements would be the number of size classes. Each bucket (or element of the array), basically, holds the offset to a free block within that segment of the particular size class. This free block will then have a link to another free block of same size class, if it exists in that segment. This way a link of all the free blocks of a particular size class is made.

Centralized Chunk Repository:

The methods described herein can be used to maintain a centralized chunk repository. A free chunk to non-free chunk ratio is considered for each thread. Whenever this ratio has increased above a threshold, the library will move few free chunks to a central repository. Whenever the thread requires a new chunk it will look into the centralized chunk repository. A thread access central repository for new free chunks is illustrated in the FIG. 9.

Figure 10:
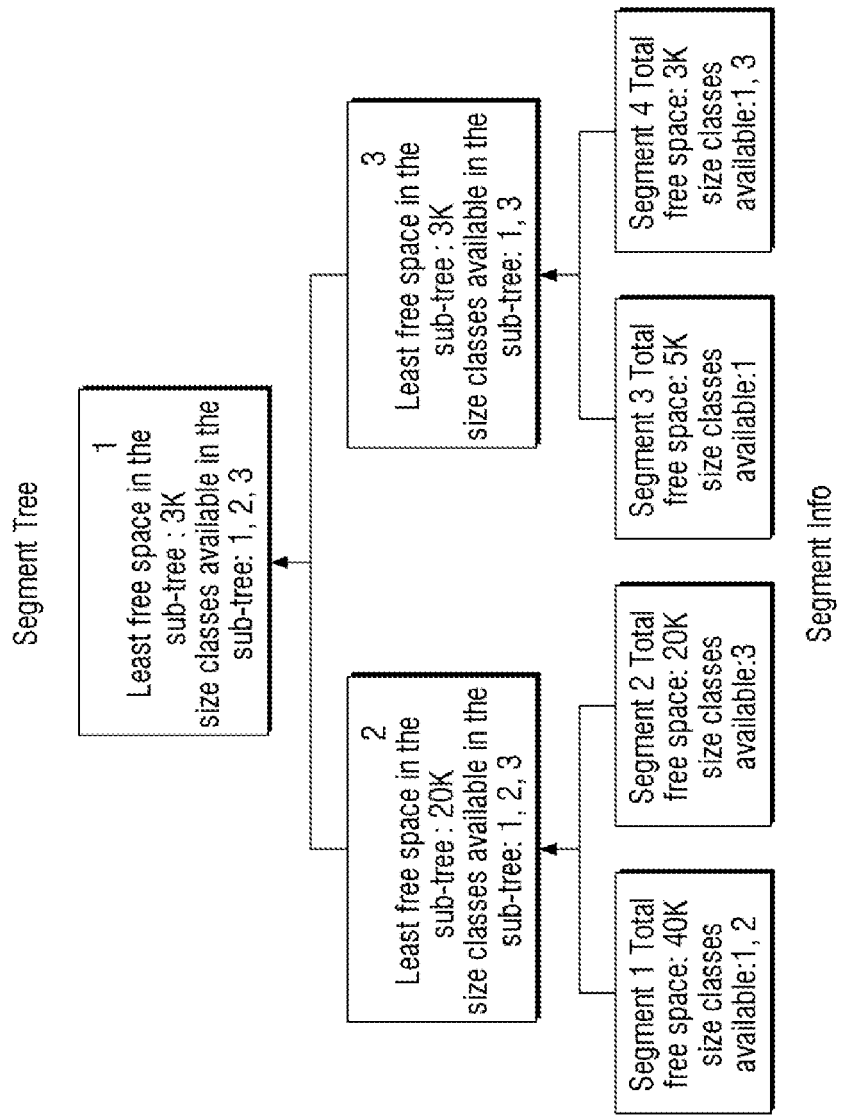
FIG. 10 is an example illustration of finding a segment, according to an embodiment as disclosed herein.

FIG. 10 is an example illustration of finding the segment, according to an embodiment as disclosed herein.

Consider that a user knows which chunk to refer to and is now finding the segment.

Let's assume that an object of size class 1 is needed. The process will be as follows.

a) Refer to chunk information to see if the size class 1 can be used by the segment tree in the chunk. This is checked by checking the ST1 element. This gives a view of the whole segment.
b) Here, the user can see that size class 1 is available any place in the subtrees represented by ST1.
c) Further, the user of the host device 100 checks the children on ST1→ST2 and ST3, the user of the host device 100 can observe that both have size class 1 available in their sub tree but the least size is in ST3 which is 3k.
d) Further, the user of the host device 100 checks the segment 3 and segment 4 as represented by the ST3 and selects segment 4 as it has size class 1 available and free space of segment 3>segment 4.

Request Size Less than CHUNK_SIZE:
The following is the process when request size less than CHUNK_SIZE.
a) The library maintains the current chunk pointer for each thread. This is to get to the chunk that services the request quickly.
b) Then, the segment tree is accessed to check if the incoming request can actually be served using the current chunk.
c) If the chunk can service the incoming request, then proceed to find the segment which can service.
d) The idea behind selection of the segment is to try to best fit the block request depending on the size of the blocks. The methods described herein execute this while trying to fit it into the segment which is already being used and is least free.
e) This way multiple objects are clubbed into the single segment.
f) The method can be used to updates the data structures of the segment tree and segment information.
g) However, if the current chunk pointer cannot service the current request, the method needs to find another chunk.
h) The method can be used to find another chunk from among the thread-specific chunks.
i) Finding a chunk will be done using the free-size ordered tree.
j) The method can be used to traverse the tree to find the appropriate chunk that can also hold the incoming request.
k) This will become the current chunk now and the after this, the process for allocation of the block is the same as above.
l) If thread doesn't have other chunks or the other chunks can't service the request then we take new chunks
  1. from the central pool, if any chunks exist in the central pool, or
  2. by doing an mmap new chunks
m) Once the chunk and segment is known, library will look up the hash table and find a block in the required size class and remove it from the hash bucket.
n) Once the block is chosen, a header is written indicating the size of the block and the previous link.

Request Size Greater than CHUNK_SIZE:
The handling is little different from when the request size is lesser. This is due to the fact that the method can still operates at the chunk level.
a) For any size greater than chunk size, the library rounds it up to multiple of the CHUNK_SIZE.
b) The method needs that many contiguous chunks.
c) The method starts the object from a free chunk.
d) The object header is created for the whole area. This is present in the first segment of the first chunk.
e) All the other chunks will be indicated to have been fully used.
f) Therefore, a large object spans across multiple chunks as one unit.
g) However, internally they will be maintained as discrete chunks.

Figure 11:
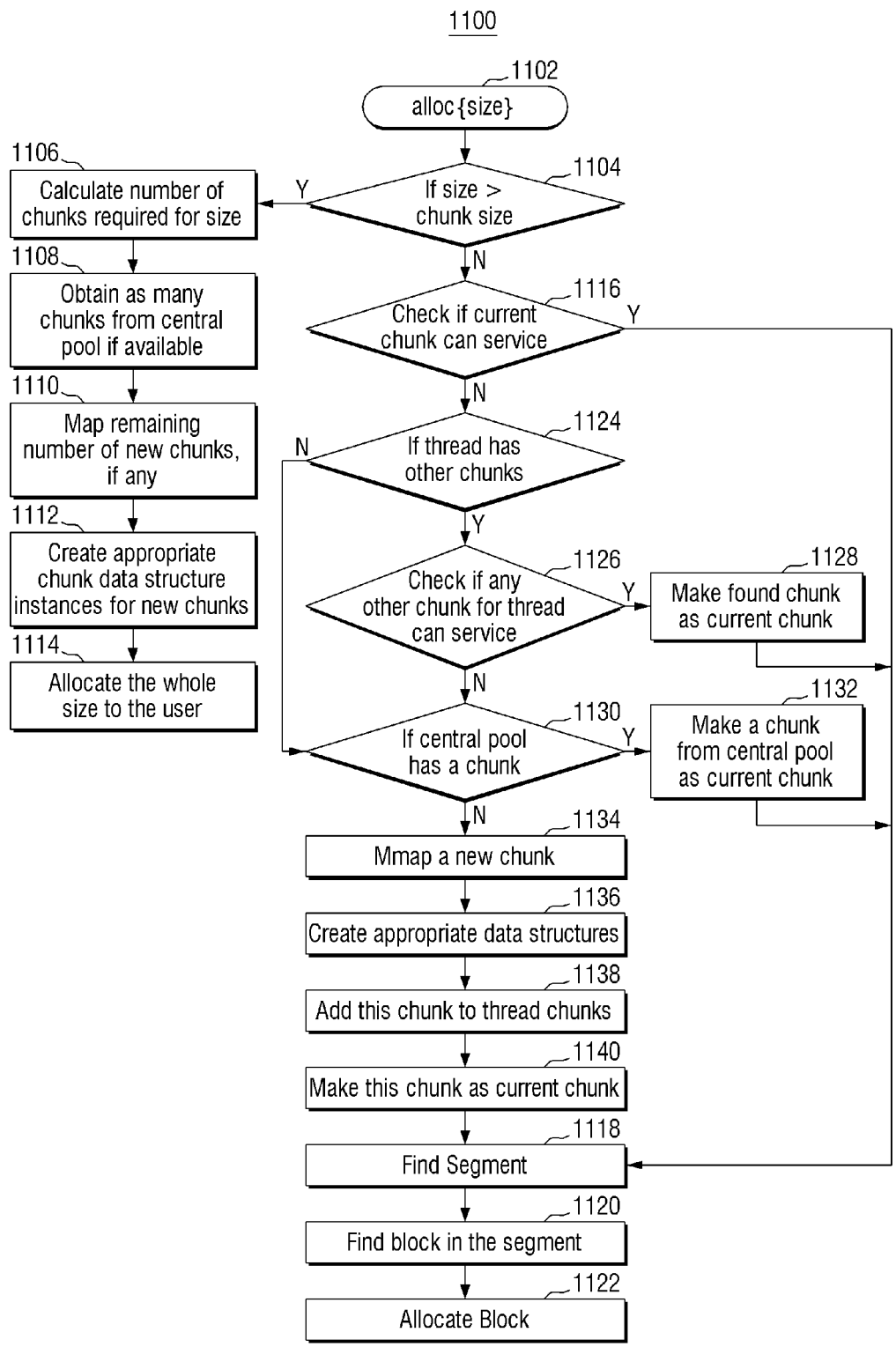
FIG. 11 is a flow diagram illustrating various operations for a memory allocation process, according to an embodiment as disclosed herein.

FIG. 11 is a flow diagram 1100 illustrating various operations for a memory allocation process, according to an embodiment as disclosed herein. The operations (1102-1140) are performed by the flash aware heap allocator 110.

Consider a scenario when the thread does not have any chunk which can service the request. At this case, the host memory controller 110a and the host memory allocator 110b has to assign a new chunk to the thread. The new chunk to the thread is done by using a mmap. The mmap basically returns the chunk address. This is the starting address of the memory area of the chunk. Once the information is obtained then, the chunk can be used.

This requires setting up of the data structures related to the chunk and initialization of the same. This also includes the addition of the chunk to the list of chunks held by the thread. Since this chunk will be now used to service the request, the process mark the chunk as the current chunk. The current chunk is a way to remember the chunk from which the most recent allocation request was served. This avoids iterating through the list of chunks a thread has to find the same.

At 1102, the method includes allocating the size. At 1104, the method includes determining whether the size is greater than a chunk size. If the size is greater than chunk size then, at 1106, the method includes calculating a number of chunks required for the size. At 1108, the method includes obtaining as many chunks from a central pool if available. At 1110, the method includes mapping remaining number of new chunks, if any. At 1112, the method includes creating appropriate chunk data structure instances for the new chunks. At 1114, the method includes allocating the whole size to the user space.

If the size is not greater than chunk size then, at 1116, the method includes determining if a current chunk can service for the application 120. If the current chunk can service for the application 120 then, at 1118, the method includes detecting the segment. At 1120, the method includes obtaining the block in the segment. At 1122, the method includes allocating the block for the application 120.

If the current chunk cannot service for the application 120 then, at 1124, the method includes determining that the thread has other chunks. If the thread has other chunks then, at 1126, the method includes determining that any other chunk for the thread can service for the application 120. If any other chunk for the thread can service for the application 120 then, at 1128, the method includes determining that found chunk as a current chunk.

If the thread does not have the chunks, at 1130, method includes determining that a central pool has a chunk. If the central pool has the chunk then at 1132, the method includes providing a chunk from the central pool as a current chunk.

If the central pool does not have the chunk then at 1134, the chunk to the thread is done by using a mmap. At 1136, the method includes creating appropriate data structures and at 1138, the method includes adding the chunk to the thread chunks. At 1140, the method includes providing the chunk as the current chunk.

The various actions, acts, blocks, steps, or the like in the flow diagram 1100 may be performed in the order presented, in a different order or simultaneously. Further, in some embodiments, some of the actions, acts, blocks, steps, or the like may be omitted, added, modified, skipped, or the like without departing from the scope of the invention(s) described herein.

Figure 12:
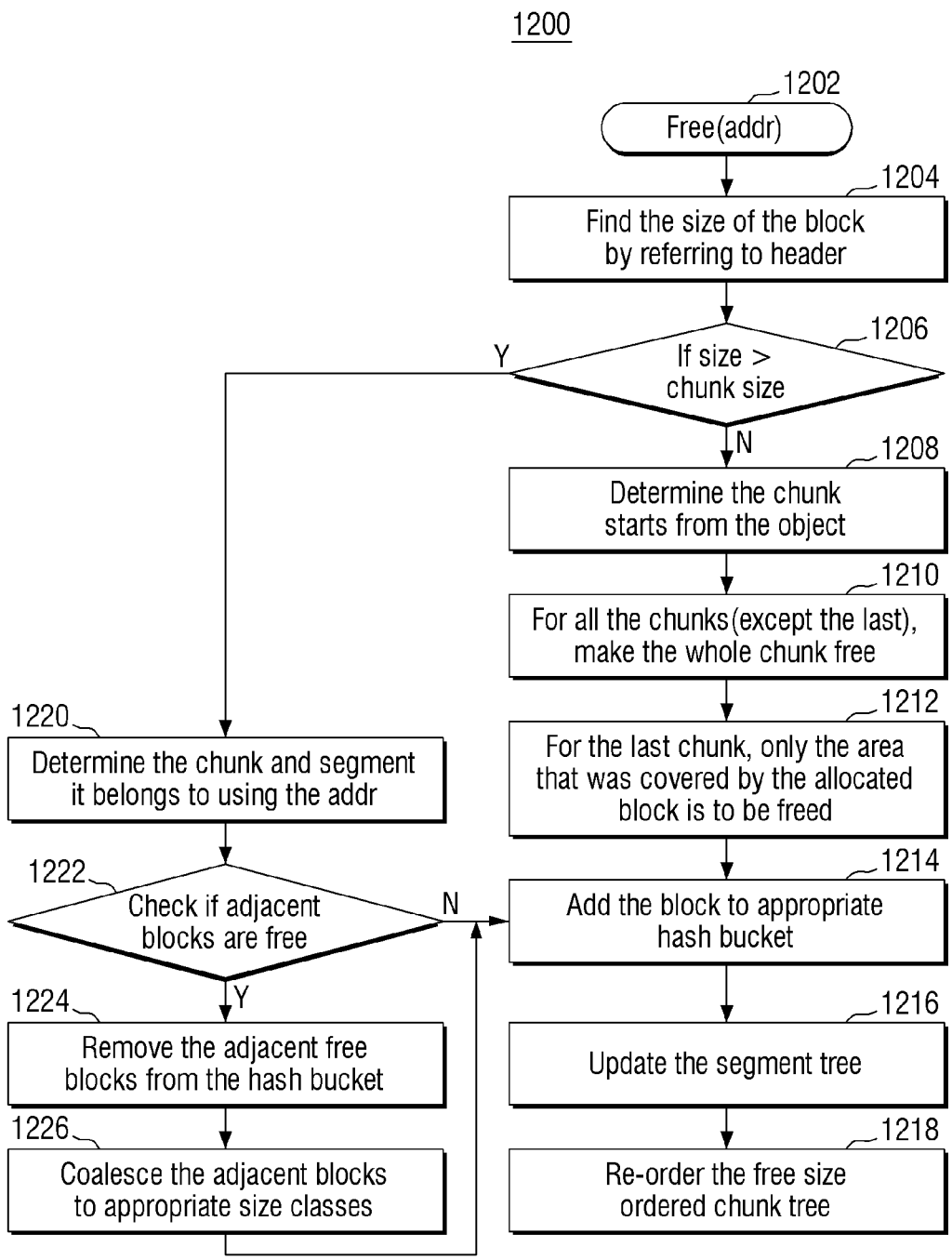
FIG. 12 is a flow diagram illustrating various operations for a memory de-allocation process, according to an embodiment as disclosed herein.

FIG. 12 is a flow diagram 1200 illustrating various operations for a memory de-allocation process, according to an embodiment as disclosed herein. The operations (1202-1226) are performed by the flash aware heap allocator 110. At 1202, the method includes detecting that the chunk is free. At 1204, the method includes determining the size of the block by referring to a header. At 1206, the method includes determining whether the size is less than a CHUNK_SIZE. If the size is not less than the CHUNK_SIZE then at 1208, the method includes determining the chunk starts from the object.

At 1210, the method includes making the whole chunk free for all the chunks except the last chunks. At 1212, the method includes providing the area that was covered by the allocated block is to be freed for the last chunk. At 1214, the method includes adding the block to an appropriate hash bucket. At 1216, the method includes updating the segment tree and at 1218, the method includes re-ordering the free size ordered chunk tree. At 1220, the method includes determining the chunk and segment it belongs to using the address and at 1222, the method includes determining that adjacent blocks are free. If the adjacent blocks are free then, at 1224, the method includes removing the adjacent free blocks from the hash bucket. At 1226, the method includes coalescing the adjacent blocks to appropriate size classes.

The various actions, acts, blocks, steps, or the like in the flow diagram 1200 may be performed in the order presented, in a different order or simultaneously. Further, in some embodiments, some of the actions, acts, blocks, steps, or the like may be omitted, added, modified, skipped, or the like without departing from the scope of the invention(s) described herein.

Object Size Lesser than CHUNK_SIZE:

In the case, when object size is lesser than CHUNK_SIZE, the library does the following.
  a) When a free happens, the object header is referred for the size.
  b) If the size is lesser than the CHUNK_SIZE, the method can be used to determine the chunk and segment using an address argument.
  c) Coalescing is to be done with adjacent blocks.
  d) This is necessary because the method should be able to service comparatively larger requests. Otherwise, the block which was made for, say, an 8-byte allocation, will always have to be used as that.
  e) The method can be used to update the hash bucket, segment tree etc.
  f) The method should also re-order the free size ordered chunk tree.

Object Size Greater than CHUNK_SIZE:

In this case, there are multiple chunks forming the object. The library frees up every single chunk that's a part of the object and makes it available for any kind of request.
  a) If the size is greater than CHUNK_SIZE, then the method knows how many next chunks are parts of that object.
  b) The method can be used to determine the starting chunk using the address.
  c) The method can be used to free up each of the chunk so they may be used on their own.

Figure 13:
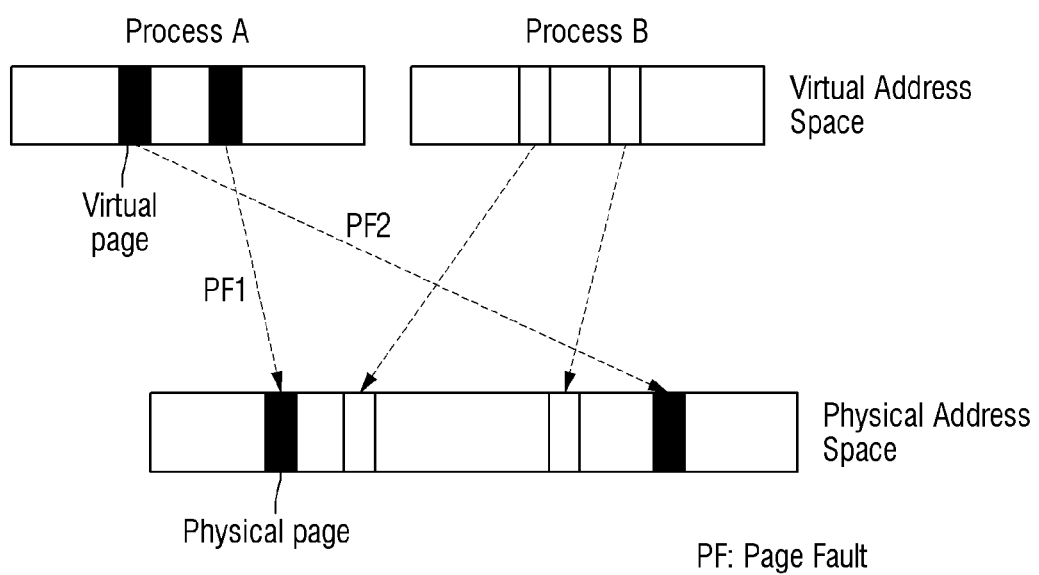
FIG. 13 illustrates a virtual allocation and physical page mapping, according to the prior art.
Figure 14:
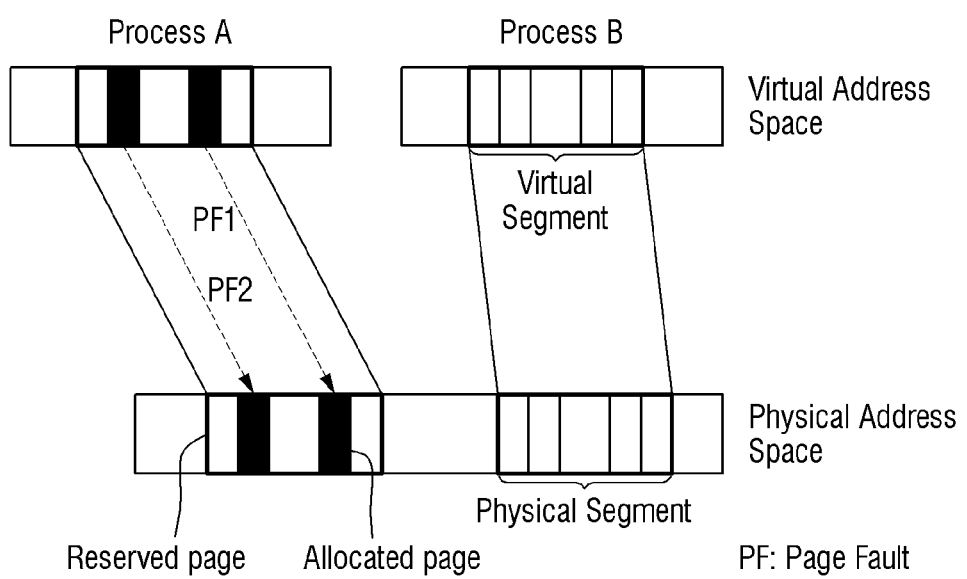
FIG. 14 illustrates a virtual allocation and a physical page mapping, according to an embodiment as disclosed herein.

The conventional allocations may result in the random physical page mapping as shown in FIG. 13. The methods described herein will map contiguous pages in the virtual segment to contiguous physical pages in the corresponding physical segment. The granularity of contiguity ensured for the applications 120, both in the physical space and the virtual space, is in terms of the segment as shown in the FIG. 14.

The concept of segments introduces the pre-allocation (reservation) of the pages in the segment as pre-allocated pages. Those pages are which are not used right now and are expected to be used in the near future. In a scenario a user heap allocator will allocate many virtual areas contiguously, but the user access will happen only in random pages in those areas. This can lead to a situation where the physical pages are not available since most of them are pre-allocated pages or pages reserved for future accesses. This lead to a concept called stealing of reserved pages.

A page stealing means the reserved pages are used for mapping (allocation) of the virtual pages other than the intended ones. This happens when the number of pages in free list falls below the threshold.

The page stealing requires the metadata information to be kept at the granularity of the page (4k), and the information about the pages which are stolen and which are reserved but not stolen are also kept in the metadata. This lead to a huge metadata overhead and this much metadata cannot be kept in system DRAM.

The information about an unused (freed) segment can be passed to the device as a DISCARD command. This will help the device in removing the mapping for those segments. This will largely reduce the metadata overhead of the device firmware. The DISCARD command can be issued for the same segments by the driver.

Figure 15A:
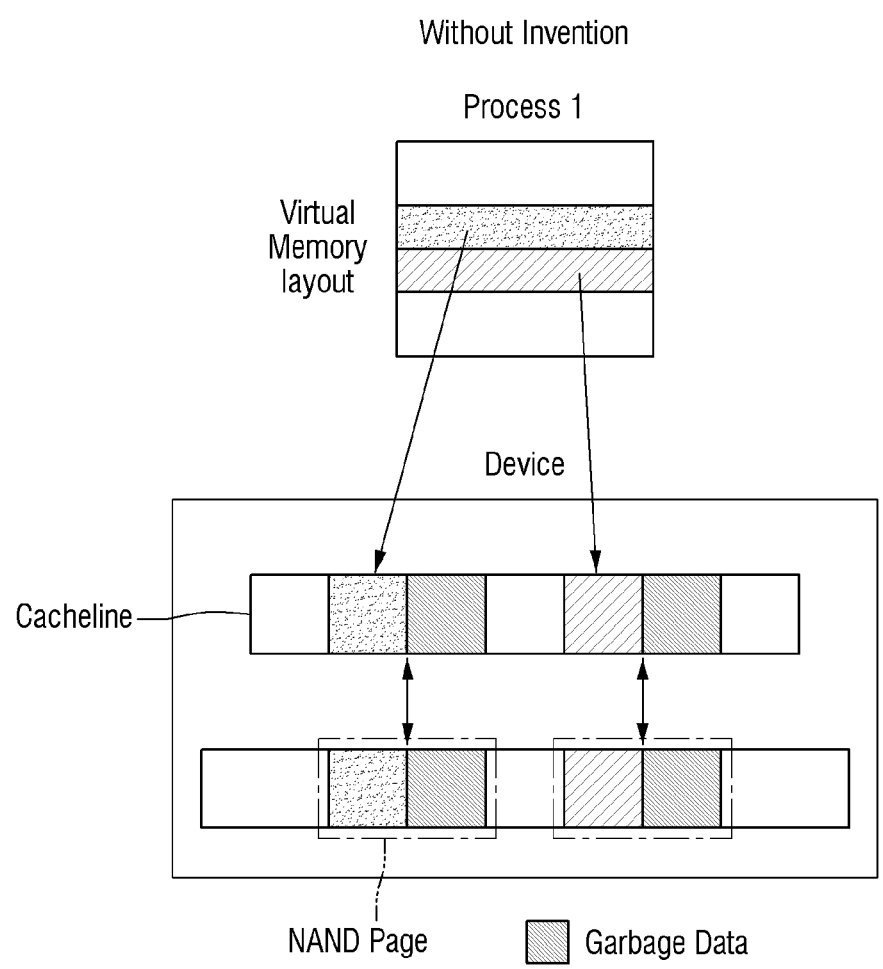
FIG. 15a illustrates the underutilization of device cache line by conventional heap allocators, according to prior art.

FIG. 15a illustrates the underutilization of device cache line by conventional heap allocators. The underutilization of the cache line causes write amplification and hence, lower life span of flash-based devices (i.e., higher cache flush rate results in the higher NAND page writes which in turn affects the life span of the host device 100. Increase in a read-modify-write of the NAND pages due to under-utilization of the cache line causes write amplification and hence lower life span).

Figure 15B:
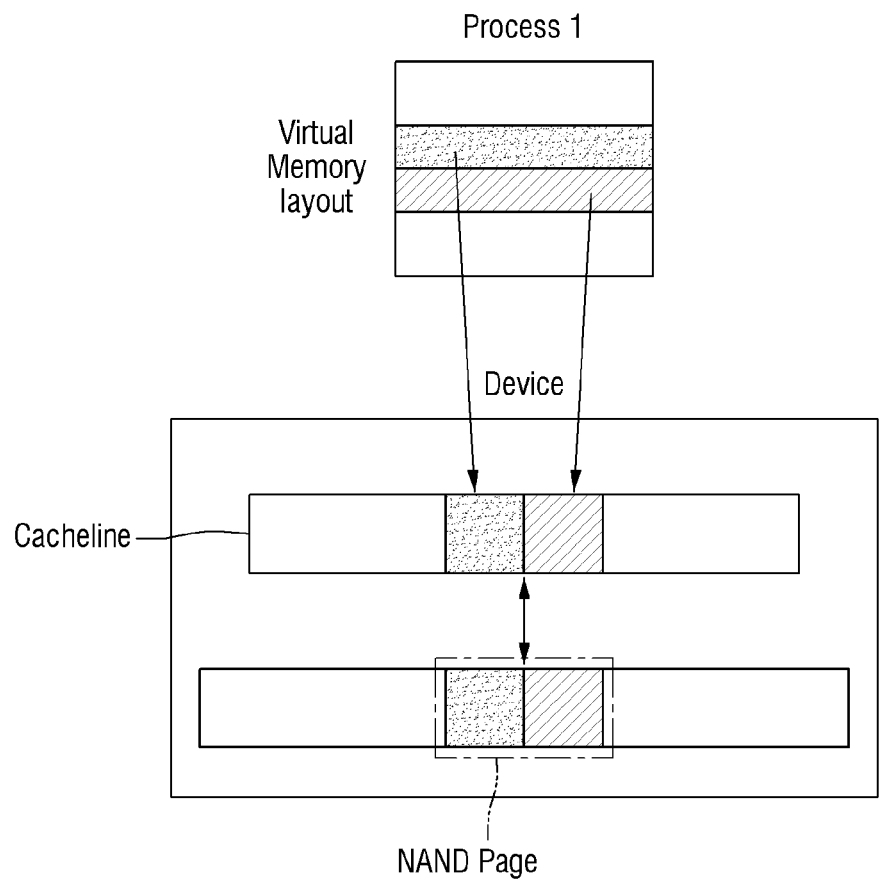
FIG. 15b illustrates better utilization of device cache line, according to an embodiment as disclosed herein.

FIG. 15b illustrates better utilization of a device cache line, according to an embodiment as disclosed herein. The memory allocations happen only from the chunks reserved for the thread. These chunks are not used for allocation for other threads. This helps in avoiding the contention of locks/resources etc. This results in reducing in the read-modify-write of the NAND pages due to better utilization of the cache line and increasing the life span of the host device 100.

FIG. 16 is an example illustration in which a reduction of a device cache footprint is explained, according to an embodiment as disclosed herein. The concept of segments will reduce the device cache footprint of processes. The number unwanted cache lines to be loaded will be greatly reduced as shown in the notation "b" of the FIG. 16, whereas the notation "a" of the FIG. 16 illustrates the usage of the number unwanted cache lines in the device cache line. The method can be used to minimize the NAND page accesses by giving contiguous physical page allocation in the segment, so that the number of NAND page loads can be minimized for any operation on the flash-based byte addressable device.

Figure 17:
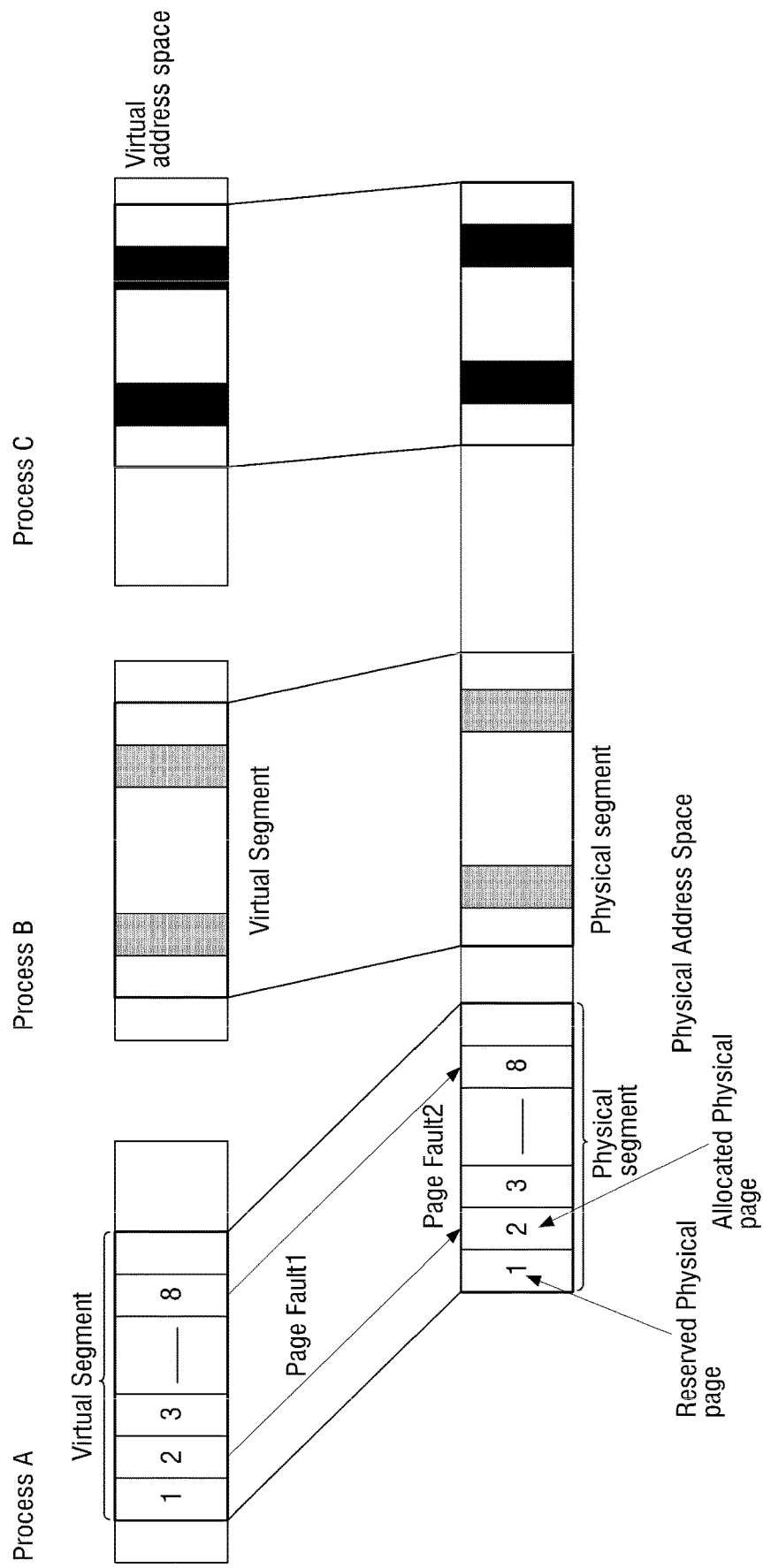
FIG. 17 is an example illustration in which a segment based allocation is explained during a page fault, according to an embodiment as disclosed herein.

The segment based allocation during the page fault is explained as shown in the FIG. 17. On the page fault, the device driver 110d checks if the virtual segment already mapped to the physical segment. The host memory allocator 110b checks all the PTEs in the same segment. If there is no mapping, the device driver 110d reserves the physical segment on the device and does the page mapping in the OS 130, all other pages in the segment are put in the reserved state.

Figure 18:
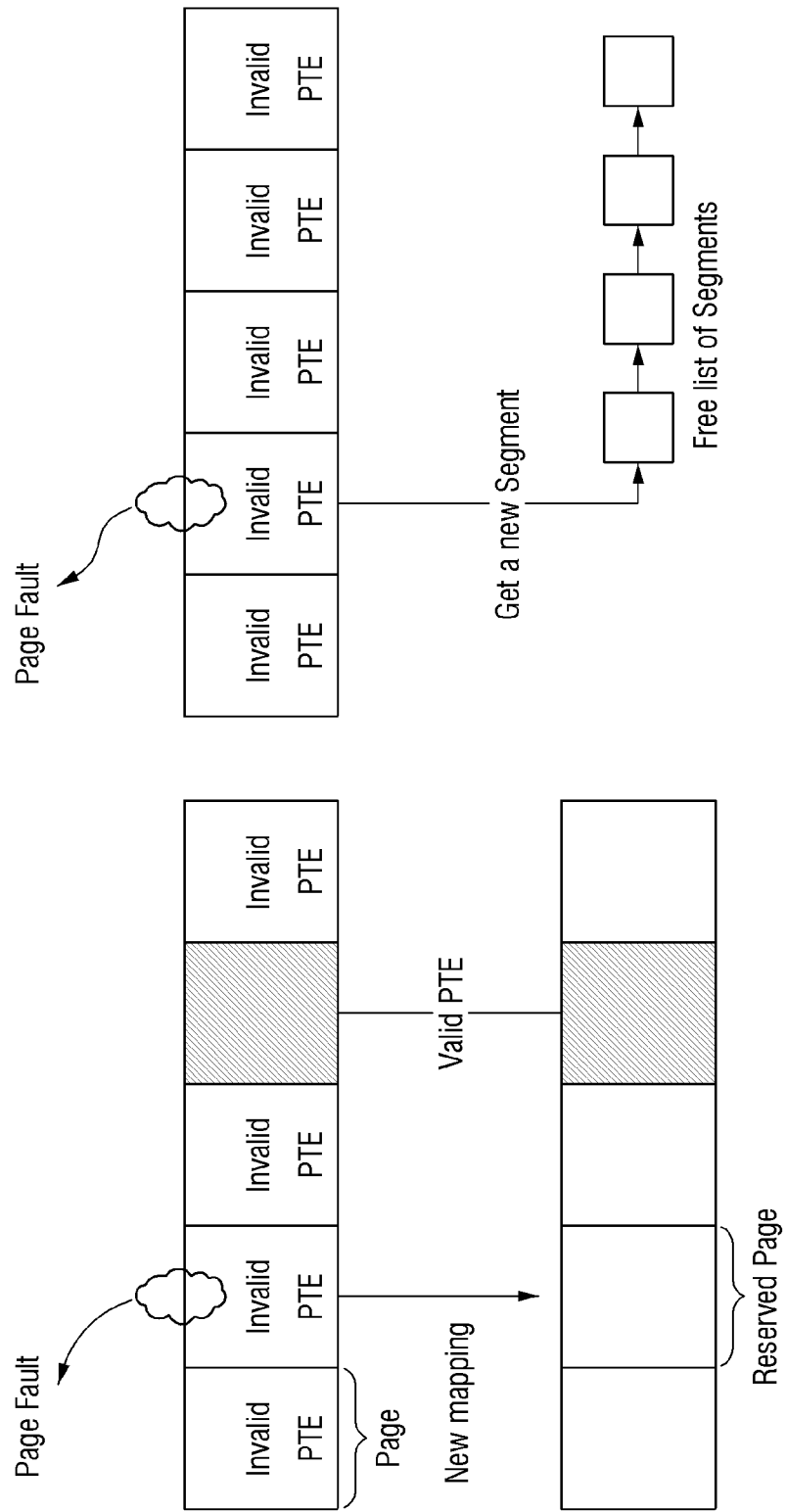
FIG. 18 illustrates a pre-allocation in the segment, according to an embodiment as disclosed herein.

FIG. 18 illustrates the pre-allocation in the segment, according to an embodiment as disclosed herein. Whenever the page fault happens for the virtual page in the segment, along with assigning the physical page for that request, a number of nearest physical pages are also tentatively reserved the same segment. Those pages are not available for allocation for other segments until out-of-memory situation arises. So, if a page fault happens for any other page in the same segment, the reserved page is found and mapped to the virtual address. This has the effect of the segment being contiguous in both virtual and physical space.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein. Examples of variations for embodiments are described below.

In an embodiment, the each of the segment of the at least one chunk is allocated contiguously in the memory space and is equal to a size of at least one contiguous device page.

In an embodiment, all the threads associated with the applications is allocated contiguously to at least one chunk from the plurality of chunks and the threads allocate only from the chunks assigned to them.

In an embodiment, each thread associated with the application is assigned with at least one chunk from the plurality of chunks, where the threads allocated from the chunks is assigned to the application.

In an embodiment, a least free chunk from the plurality of chunks is first allocated compared to the other chunks from the plurality of chunks.

In an embodiment, the plurality of logical segments corresponds to device pages. Each of the logical segments represents a contiguous physical range stored at the flash based byte addressable device.

In an embodiment, wherein a least free segment from the plurality of segments, which services a current allocation request, is first allocated compared to the other segments from the plurality of segments in the associated chunk.

In an embodiment, the current allocation request is translated to one of the pre-defined allocation sizes available within the segment.

In an embodiment, the device pages are pinned to a device cache.

In an embodiment, the method includes storing, by the host device, a plurality of logical-to-physical (LTP) entries. Each of the LTP entries represent a mapping of a logical address to a physical address in the flash based byte addressable device. Further, the method includes mapping, by the host device, each of a logical segment of each of the chunks with a physical segment in the flash based byte addressable device. Further, the method includes performing, by the host device, one of checking all page table entries (PTEs) in the physical segment when the logical segment is mapped with the physical segment or reserving the physical segment when the logical segment is not mapped with the physical segment.

In an embodiment, the memory space is configured to store metadata in a metadata partition in the flash based byte addressable device, where the metadata partition is separated from the user allocated portion in the flash based byte addressable device.

In an embodiment, the contiguous virtual space is managed by index based data structures.

In an embodiment, each of the logical segment includes at least one allocated page, wherein a newly allocated logical segment can borrow at least one physical pages from other logical segments, if at least one physical page is yet to be allocated.

In an embodiment, information of at least one segment from the plurality of unused segments is shared with the flash-based byte addressable device for the device to use the information to manipulate its mapping table.

We claim:

1. A method for flash-aware heap memory management, comprising:
    reserving, in a memory space of at least one process, a contiguous virtual space, wherein an entire size of the contiguous virtual space that is reserved is equivalent to a size of a device that is flash-based byte addressable;
    partitioning, by a host device, the contiguous virtual space of the device into a plurality of chunks, wherein each chunk comprises a plurality of logical segments;
    in response to a page fault for a page in a first logical segment of the plurality of logical segments, mapping a physical page, in the device, to the page, wherein the physical page was previously reserved in response to another page fault for another page in the first logical segment,
    receiving, by the host device, a memory allocation request from a thread associated with an application;
    determining, by the host device from the plurality of chunks, at least one chunk comprising a least free logical segment compared to the other chunks from the plurality of chunks; and
    allocating, by the host device to the thread, the at least one chunk comprising the least free logical segment,
    wherein each thread associated with the application is assigned with the at least one chunk from the plurality of chunks, wherein each chunk allocated from the plurality of chunks in the allocating is assigned to the application, and
    wherein the allocating to the thread is restricted to only from the at least one chunk assigned for the thread and each of the at least one chunk assigned for the thread is not used for memory allocation for other threads except for the thread,
    wherein the contiguous virtual space comprises a metadata area that stores a plurality of segment trees and a plurality of segment info arrays associated with the plurality of chunks, respectively, and
    wherein each of the at least one chunk comprising the least free logical segment is determined using the plurality of segment trees and the plurality of segment info arrays.

2. The method of claim 1, wherein each of the plurality of logical segments, of the at least one chunk, is allocated contiguously in the memory space and is equal to a size of at least one contiguous device page.

3. The method of claim 1, wherein the plurality of logical segments correspond to device pages, wherein each of the logical segments represents a contiguous physical range stored at the device.

4. The method of claim 1, further comprising:
storing, by the host device, a plurality of logical-to-physical (LTP) entries, wherein each of the LTP entries represents a mapping of a logical address to a physical address in the device;
mapping, by the host device, a logical segment of each of the plurality of chunks with a physical segment in the device; and
performing, by the host device, one of checking all page table entries (PTEs) in the physical segment when the logical segment is mapped with the physical segment or reserving the physical segment when the logical segment is not mapped with the physical segment.

5. The method of claim 3, wherein the device pages are pinned to a device cache.

6. The method of claim 1, wherein information related to each thread among a plurality of threads is stored in a host memory.

7. The method of claim 1, wherein each of the logical segments comprise at least one allocated page, wherein an allocated logical segment borrows at least one physical page from other logical segments, when the at least one physical page is yet to be allocated.

8. The method of claim 1, wherein information that at least one logical segment from the plurality of logical segments is unused, is shared with the device for the host device to use the information to manipulate in a mapping table.

9. A method for flash-aware heap memory management, comprising:
partitioning, by a host device, a size of a flash-based byte addressable device into a plurality of chunks, wherein each chunk comprises a plurality of logical segments;
in response to a page fault for a page in a first logical segment of the plurality of logical segments, mapping a physical page, in the device, to the page, wherein the physical page was previously reserved in response to another page fault for another page in the first logical segment,
storing, by the host device, a plurality of logical-to-physical (LTP) entries of the flash-based byte addressable device, wherein each of the LTP entries represents a logical address to a physical address mapping in the flash-based byte addressable device;
mapping, by the host device, each of a logical segment of a chunk from the plurality of chunks with a physical segment in the flash-based byte addressable device; and
performing, by the host device, checking all page table entries (PTEs) in the physical segment when the logical segment is mapped with the physical segment, and reserving the physical segment when the logical segment is not mapped with the physical segment.

10. The method of claim 9, wherein each of the logical segments comprise at least one pre-allocated page, wherein at least one of the pre-allocated page is mapped to at least one virtual page when a number of pages in a free list is below a threshold.

11. A host device for flash-aware heap memory management, comprising:
a processor;
a host memory controller configured to:
reserve, in a memory space of at least one process, a contiguous virtual space, wherein an entire size of the contiguous virtual space that is reserved is equivalent to a size of a device that is flash-based byte addressable;
partition the contiguous virtual space of the device into a plurality of chunks, wherein each chunk comprises a plurality of logical segments;
in response to a page fault for a page in a first logical segment of the plurality of logical segments, mapping a physical page, in the device, to the page, wherein the physical page was previously reserved in response to another page fault for another page in the first logical segment, and
receive a memory allocation request from a thread associated with an application; and
a host memory allocator configured to:
determine, from the plurality of chunks, at least one chunk comprising a least free logical segment compared to the other chunks from the plurality of chunks; and
allocate the at least one chunk comprising the least free logical segment to the thread,
wherein each thread associated with the application is assigned with the at least one chunk from the plurality of chunks, wherein each chunk allocated from the plurality of chunks in the allocating is assigned to the application, and
wherein the allocating to the thread is restricted to only from the at least one chunk assigned for the thread and each of the at least one chunk assigned for the thread is not used for memory allocation for other threads except for the thread,
wherein the contiguous virtual space comprises a metadata area that stores a plurality of segment trees and a plurality of segment info arrays associated with the plurality of chunks, respectively,
wherein each of the at least one chunk comprising the least free logical segment is determined using the plurality of segment trees and the plurality of segment info arrays.

12. The host device of claim 11, wherein each of the plurality of logical segments, of the at least one chunk, is allocated contiguously in the memory space and is equal to a size of at least one contiguous device page.

13. The host device of claim 11, wherein the plurality of logical segments correspond to device pages, wherein each of the logical segments represents a contiguous physical range stored at the device.

14. The host device of claim 11, further comprising:
a logical-to-physical (LTP) address controller configured to:
store a plurality of logical-to-physical (LTP) entries, wherein each of the LTP entries represents a mapping of a logical address to a physical address in the device; and
a device driver configured to:
map each of a logical segment of each of the plurality of chunks with a physical segment in the device; and
perform one of check all page table entries (PTEs) in the physical segment when the logical segment is mapped with the physical segment, or reserve the physical segment when the logical segment is not mapped with the physical segment.

15. The host device of claim 13, wherein the device pages are pinned to a device cache.

16. The host device of claim 11, wherein information related to each thread among a plurality of threads is stored in a host memory.

17. The host device of claim 11, wherein each of the logical segments comprise at least one allocated page, wherein an allocated logical segment borrows at least one physical page from other logical segments, if the at least one physical page is yet to be allocated.

18. The host device of claim 11, wherein information that at least one logical segment from the plurality of logical segments is unused, is shared with the device for the host device to use the information to manipulate in a mapping table.

\* \* \* \* \*